Patented May 15, 1923.

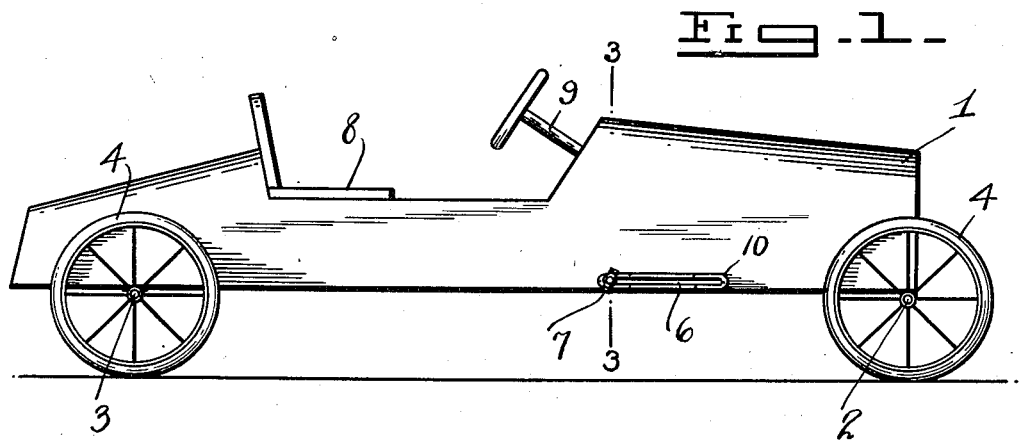
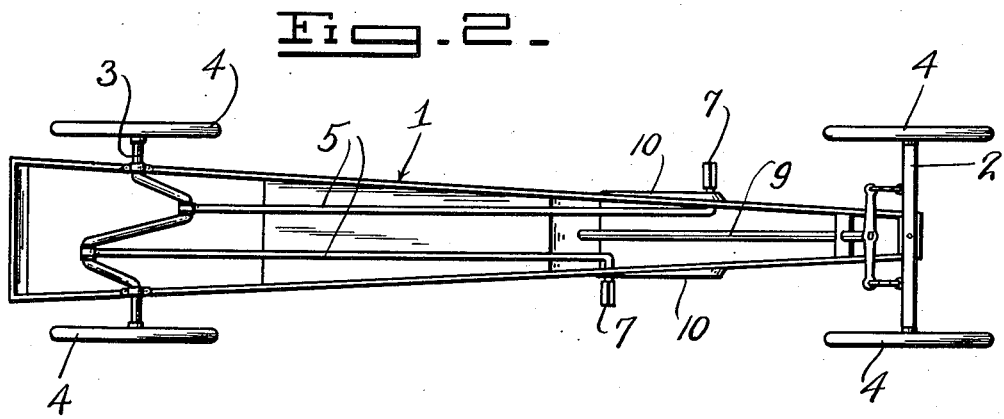
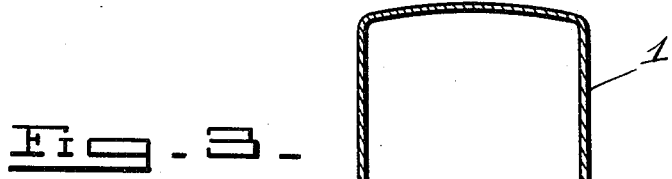

1,455,404

UNITED STATES PATENT OFFICE.

FRANK MULVENY, OF FALL RIVER, MASSACHUSETTS.

TOY VEHICLE.

Application filed February 20, 1922. Serial No. 538,027.

*To all whom it may concern:*

Be it known that I, FRANK MULVENY, a citizen of the United States, residing at Fall River, in the county of Bristol and State of Massachusetts, have invented new and useful Improvements in Toy Vehicles, of which the following is a specification.

This invention relates to a toy vehicle which is adapted to be propelled by the feet of the user, the primary object of the invention being to provide a body of tapered shape, so that it can be straddled by the child, and a pair of reciprocating members which are connected with a cranked rear axle and which have their front ends extending through the narrow part of the body so that said ends can be engaged by the feet of the child to reciprocate the members and thus rotate the axle to give movement to the vehicle.

Another object of the invention is to provide guiding slots in the body of the vehicle for the bent ends of the reciprocating members and to place pedals on said ends.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side elevation of the invention.

Figure 2 is a bottom view thereof.

Figure 3 is a section on line 3—3 of Figure 1.

In these views 1 indicates the body which is of tapered shape, as shown, and made to simulate the body of a racing automobile. The body is supported by the front axle 2 and the rear axle 3, said rear axle being provided with the double cranks, as shown. The axles carry the usual wheels 4. Longitudinally extending rods 5 have their rear ends connected with the cranks of the rear axle and the front ends are bent at right angles and pass through slots 6 formed in the body and the parts projecting from said guide slots are provided with pedals 7, said parts being so arranged that a child sitting in the seat 8 can place his feet upon the pedals and thus by pushing one pedal forwardly the crank shaft will be turned, drawing the other rod and pedal rearwardly. This other rod and pedal is then pushed forwardly by the child and thus the rear axle will be rotated to propel the vehicle.

As will be seen the narrow part of the body, adjacent the front thereof, is of such a width that the child can straddle it and thus place his feet on the pedals which extend through the guide slots in the body. The rods 5 extend in a straight line from the cranks to the guide slots in the body and all the parts, except the pedals are hidden by the body.

The front axle is pivoted to the body and is connected with the steering post 9 in the usual manner. Reinforcing parts 10 are placed on the body around the guide slots 6 and these parts are so formed as to provide a straight surface for the inner ends of the pedals to slide against, thus providing means for preventing the inward lateral thrust of the pedals and maintaining them in planes parallel to those traversed by the rods 5. Through the provision of this structure, the rods 5 reciprocate in planes at right angles to the cranks, thus reducing to a minimum any tendency of lateral play.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A toy vehicle of the class described comprising a tapered body, a cranked rear axle for the same, a front axle, wheels carried by the axle, said body having guide slots in the sides of its narrow part, a pair of longitudinally extending rods having their rear ends connected with the cranks of the rear axle and the front ends bent and passing through the slots and pedals on said bent ends.

2. A toy vehicle of the class described comprising a body having slots therein, wheels supporting the body, steering means connected to certain of said wheels, a cranked driving axle, reciprocating members connected to the crank axle and having laterally disposed ends passing through the slots in the body, pedals on the laterally disposed ends of the reciprocating members and reinforcing elements surrounding the slots in the body.

In testimony whereof I affix my signature.

FRANK MULVENY.